US009277088B2

(12) United States Patent
Yamanakajima

(10) Patent No.: US 9,277,088 B2
(45) Date of Patent: Mar. 1, 2016

(54) INFORMATION PROCESSING APPARATUS, CONTROL METHOD FOR THE SAME AND COMPUTER-READABLE MEDIUM

(75) Inventor: Kazunari Yamanakajima, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 943 days.

(21) Appl. No.: 13/438,233

(22) Filed: Apr. 3, 2012

(65) Prior Publication Data

US 2012/0275713 A1    Nov. 1, 2012

(30) Foreign Application Priority Data

Apr. 27, 2011  (JP) ................ 2011-100135

(51) Int. Cl.
  *G06K 9/00*  (2006.01)
  *H04N 1/32*  (2006.01)
  *G06F 17/30*  (2006.01)
  *H04N 1/00*  (2006.01)

(52) U.S. Cl.
  CPC ........ *H04N 1/32128* (2013.01); *G06F 17/3028* (2013.01); *H04N 1/00196* (2013.01); *H04N 2201/3253* (2013.01)

(58) Field of Classification Search
  None
  See application file for complete search history.

(56) References Cited

U.S. PATENT DOCUMENTS

2004/0064338 A1* 4/2004 Shiota ............... H04N 1/00132
  705/1.1
2006/0209089 A1* 9/2006 Date ................ G06F 17/30265
  345/632

(Continued)

FOREIGN PATENT DOCUMENTS

JP   2009-246822 A    10/2009
JP   2013-500537 A     1/2013
WO   2011/014230 A2    2/2011

OTHER PUBLICATIONS

Japanese Office Action issued in corresponding application No. 2011-100135 on Feb. 20, 2015.

*Primary Examiner* — Aaron W Carter
(74) *Attorney, Agent, or Firm* — Carter, DeLuca, Farrell & Schmidt, LLP

(57) ABSTRACT

An information processing apparatus for searching, from a plurality of photo book templates, for a photo book template to lay out a plurality of images therein, comprises: a unit configured to compare position information defined for each of a plurality of image frames included in the photo book templates with position information of each of the plurality of images, and to lay out, in an image frame among the plurality of image frames, an image among the plurality of images that matches the position information defined for the image frame; and a unit configured to search for a photo book template to lay out the plurality of images therein based on the number of images laid out by the layout unit and a layout of the thus laid-out images.

11 Claims, 16 Drawing Sheets

(56) References Cited

U.S. PATENT DOCUMENTS

| | | | |
|---|---|---|---|
| 2007/0165968 A1* | 7/2007 | Terayoko | H04N 1/00132 382/305 |
| 2008/0050039 A1* | 2/2008 | Jin | G06F 17/248 382/284 |
| 2010/0047039 A1* | 2/2010 | Anderson et al. | 412/9 |
| 2010/0289818 A1* | 11/2010 | Hirooka | 345/619 |
| 2011/0025709 A1* | 2/2011 | Ptucha | G06T 11/60 345/629 |
| 2011/0050956 A1* | 3/2011 | Bessho | H04N 5/772 348/231.3 |
| 2011/0075945 A1* | 3/2011 | Yamaji | 382/284 |
| 2011/0205399 A1* | 8/2011 | Gao | G06F 17/30056 348/231.99 |
| 2012/0020648 A1* | 1/2012 | Yamaji | G11B 27/034 386/278 |
| 2012/0113475 A1* | 5/2012 | Sugiyama | G06T 11/60 358/1.18 |
| 2012/0117473 A1* | 5/2012 | Han et al. | 715/723 |
| 2012/0275713 A1* | 11/2012 | Yamanakajima | 382/218 |
| 2012/0321223 A1* | 12/2012 | Nagasaka | H04N 1/00448 382/305 |
| 2013/0004073 A1* | 1/2013 | Yamaji | G06T 11/60 382/173 |
| 2013/0129232 A1* | 5/2013 | Cok | G06K 9/00677 382/224 |
| 2013/0239049 A1* | 9/2013 | Perrodin | G06F 3/0481 715/800 |
| 2014/0071160 A1* | 3/2014 | Sugiura | G06F 17/30244 345/619 |
| 2014/0237395 A1* | 8/2014 | Ogilvie | G06F 17/243 715/760 |
| 2015/0086120 A1* | 3/2015 | Yamaji | G06T 11/60 382/195 |

* cited by examiner

PHOTO BOOK TEMPLATE SEARCH

1101 — IMAGE FILE
1102 — REFERENCE

1103 — ■ DESIGNATE DESIGN
1104 — NATURAL

1105 — ☐ SPECIFY ACCEPTABLE RANGE OF DIFFERENCE IN LONTIDUE AND LATITUDE
1106 — 0.01 SECOND(S)

1107 — ■ CONSIDER ALTITUDE
1108 — ■ CONSIDER BEARING
1109 — ■ CONSIDER IMAGE ORIENTATION
1110 — ☐ CONSIDER ANGLE OF VIEW
1111 — ☐ SPECIFY RANGE OF CREATION DATE
1112 — 2009/01/01  ~  2010/12/31 — 1113

1120 — SEARCH

F I G. 13

SEARCH RESULT

1301 — 7 PHOTO BOOK TEMPLATES HIT

1311 — CANON PARK — DETAILS — CREATE PHOTO BOOK
1312 — NUMBER OF HIT IMAGES : 17/17
1313 — CREATION DATE : 2011/03/04

1321 — FOUR SEASONS IN CANON PARK — DETAILS — CREATE PHOTO BOOK
NUMBER OF HIT IMAGES : 16/17
CREATION DATE : 2011/12/10

WALKING AROUND PARK — DETAILS — CREATE PHOTO BOOK
NUMBER OF HIT IMAGES : 16/17
CREATION DATE : 2011/06/08

CHERRY BLOSSOM VIEWING 2011 — DETAILS — CREATE PHOTO BOOK
NUMBER OF HIT IMAGES : 15/17
CREATION DATE : 2011/04/03

CANON PARK — DETAILS — CREATE PHOTO BOOK
NUMBER OF HIT IMAGES : 15/17
CREATION DATE : 2011/12/10

(1314 points to DETAILS column; 1315 points to CREATE PHOTO BOOK column)

FIG. 14

```
SEARCH RESULT

1401 — CHERRY BLOSSOM VIEWING 2011          1409         1410
1402 — CREATION DATE : 2011/04/03      CREATE PHOTO BOOK   BACK TO LIST
1403 — CREATOR : ICHIRO HONDA
1404 — NUMBER OF PAGES : 14
1405 — DESIGN : NATURAL

1406 — HIT IMAGES : 15/17
```

1407 — [row of 5 thumbnails labeled xxxxx]

[row of 5 thumbnails labeled xxxxx]

1408 — [row of 5 thumbnails labeled xxxxx]

[2 thumbnails labeled xxxxx]

F I G. 17
(X)
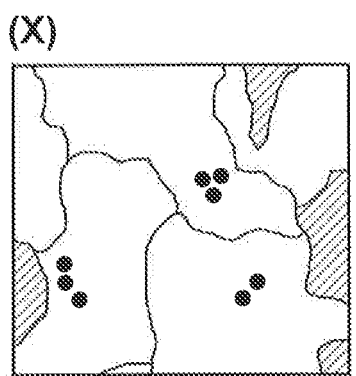
(A)
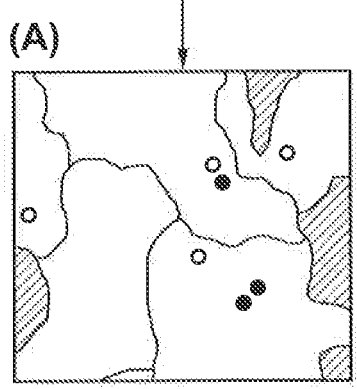
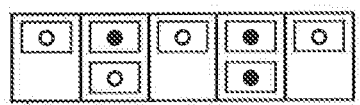
1701

INFORMATION PROCESSING APPARATUS, CONTROL METHOD FOR THE SAME AND COMPUTER-READABLE MEDIUM

BACKGROUND OF THE INVENTION

1. Field of the Invention

The present invention relates to an information processing apparatus that creates and searches tor photo book data, a control method therefor, and a computer-readable medium.

2. Description of the Related Art

As digital cameras are now widely used and computer and network technologies have developed, photo books are more frequently created on personal computers to which digital data is submitted. In many cases photo books are created with dedicated editors, and devices for saving time and effort for creation have been made.

For example, as a device for creating a photo book with images taken when visiting sightseeing places, preparing in advance templates for shooting scenes is conceivable (see Japanese Patent Laid-Open No. 2009-246822). In a sightseeing place there are frequently visited shooting spots, where many people take images in a similar manner. Therefore, time and efforts for creating a photo book can be reduced by making templates for shooting scenes at those spots. In Japanese Patent Laid-Open No. 2009-246822, a user selects a captured image, and then data of only templates relevant to the location where the image was taken is displayed. If a user selects the template data, only images corresponding to that template data are displayed.

However, in the conventional technique, a user has to take extra effort for editing, such as figuring out compositions or selecting shooting scenes every time he/she creates a new photo book. If templates can be made from the whole photo books and images can be automatically inserted, time and effort could be reduced. However, to reuse photo books as templates, a system for sharing such photo book templates is needed. In the case of simple sharing, it may be possible to share templates via a network once photo books are published on the Web.

However, even if templates are shared via a network, a user still has to take some time and effort to search for a desired one from a number of templates. Moreover, it is difficult for a user to determine just at a glance whether or not a template is one with which several images taken by the user can be inserted.

SUMMARY OF THE INVENTION

According to one aspect of the present invention, there is provided an information processing apparatus for searching, from a plurality of photo book templates, for a photo book template to lay out a plurality of images therein, the information processing apparatus comprising: a layout unit configured to compare position information defined for each of a plurality of image frames included in the photo book templates with position information of each of the plurality of images, and to lay out, in an image frame among the plurality of image frames, an image among the plurality of images that matches the position information defined for the image frame; and a search unit configured to search for a photo book template to lay out the plurality of images therein based on the number of images laid out by the layout unit and a layout of the thus laid-out images.

According to another aspect of the present invention, there is provided a method for controlling sin information processing apparatus that searches for a photo book template to lay out a plurality of images therein, the method comprising: a layout step of comparing position information defined for each of a plurality of image frames included in the photo book templates with position information of each of the plurality of images, and laying out, in an image frame among the plurality of image frames, an image among the plurality of images that matches the position information defined for the image frame; and a calculation step of calculating a degree of matching between each of the photo book templates and the plurality of images based on the number and a layout of the images laid out in the layout step.

According to another aspect of the present invention, there is provided a computer-readable medium storing a program for causing a computer to function as: a layout unit configured to compare position information defined for each of a plurality of image frames included in the photo book templates with position information of each of the plurality of images, and lay out, in an image frame among the plurality of image frames, an image among the plurality of images that matches the position information defined for the image frame, and a calculation unit configured to calculate a degree of matching between each of the photo book templates and the plurality of images based on the number and a layout of the images laid out by the layout unit.

According to the present invention, a user can obtain a desired photo book template, and time and effort taken for generating photo book data is reduced.

Further features of the present invention will become apparent from the following description of exemplary embodiments (with reference to the attached drawings).

BRIEF DESCRIPTION OF THE DRAWINGS

FIG. 13 is a diagram showing an example or a photo book template search result screen.

FIG. 14 is a diagram showing an example of a photo book template search result detail screen.

FIG. 17 is a diagram depicting photo book template search applied to a broad area.

DESCRIPTION OF THE EMBODIMENTS

A best mode of implementing the present invention will be hereinafter described with reference to the drawings.

First Embodiment

Apparatus Configuration

Figure 1:
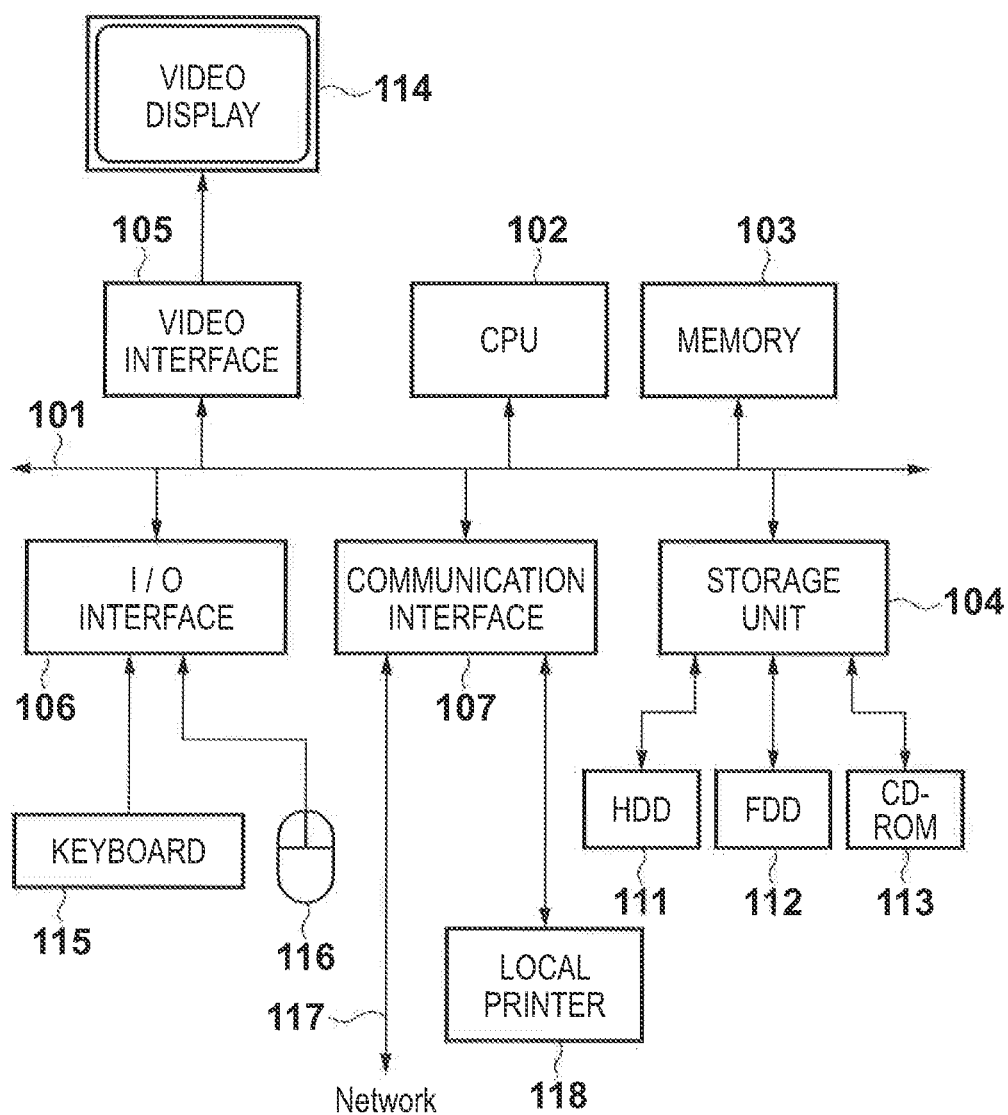
FIG. 1 is a diagram showing an example of a configuration of a computer.

FIG. 1 is a diagram showing a configuration of an information processing apparatus according to an embodiment to implement the present invention. Referring to FIG. 1, the information processing apparatus includes a CPU 102, a memory 103, a storage unit 104, a video interface 105, an input/output (hereinafter abbreviated as "I/O") interface 106, and a communication interface 107. Those components in the information processing apparatus are mutually connected via a system bus 101. The CPU 102 is a central processing unit that controls the components via the system bus 101 and performs data operation and processing. The memory 103 is a device for storing data and programs, and may be a RAM (random access memory) or a ROM (read only memory). The storage unit 104 writes and reads stored data. The storage unit 104 has a hard disk drive (HDD) 111, a Floppy® disk drive (FDD) 112, and a CD-ROM drive 113 used as a nonvolatile data source. A magnetic tape drive, a DVD-ROM, a USE memory and the like, which are not shown in FIG. 1, may also be used as the storage unit 104.

The programs according to this embodiment are read out from the storage unit 104, stored in the memory 103, and then executed by the CPU 102. Even though the programs are read out from the storage unit 104 in this embodiment, they may alternatively be read out from a ROM (not shown) or read out via the communication interface 107 from an external device.

The video interface 105 controls display output to a display device 114. The display device 114 may be a CRT or liquid crystal display. The I/O interface 106 is connected to input devices such as a keyboard 115 and a pointing device 116. An operator orders operations of the information processing apparatus by operating the keyboard 115. The pointing device 116 is designed to move a cursor on the display device 114 to select an object or a menu and perform other operations. The communication interface 107 communicates via a computer network 117 with external devices. The connected network may be a public line such as a LAN, a WAN, and the Internet. The communication interface 107 also communicates with output devices such as a local printer 118.

Figure 2:
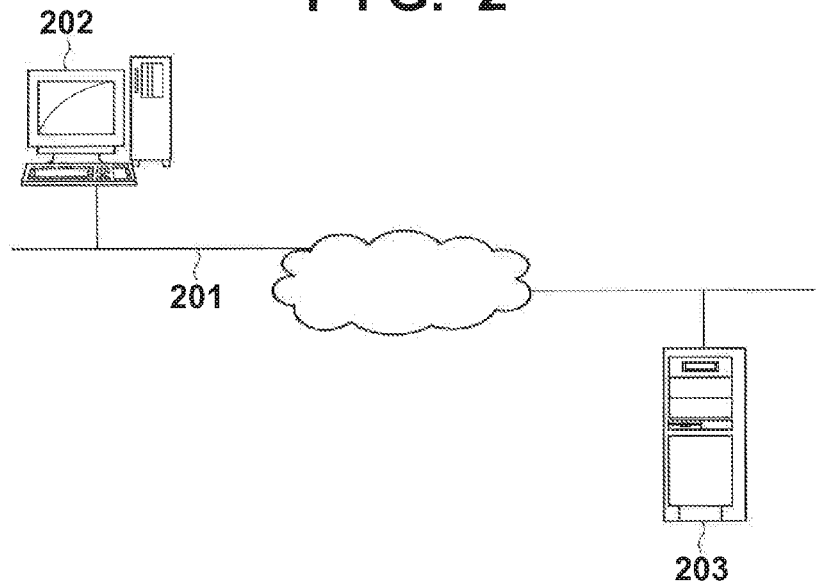
FIG. 2 is a diagram showing an example of a configuration of a network.

FIG. 2 is a network configuration diagram according to this embodiment. A computer network 201 is connected to a client personal computer (hereinafter abbreviated as "client PC") 202 and a server computer (hereinafter abbreviated as "server") 203. The computer network 201 may be a LAN, a WAN, or the Internet. The client PC 202 communicates via the computer network 201 with the server 203. In this embodiment, both the client PC 202 and the server 203 have the configuration of the information processing apparatus shown in FIG. 1. However, the configuration is not limited thereto and may further have other features.

[Application Program]

Next, a search application according to this embodiment is described. Here, it is assumed that the search application according to this embodiment works mainly on the server 203. However, a mode of the search application program working on the client PC 202 is also applicable. In the mode of the search application program working on the server 203, a screen for searching photo book templates is displayed on the client PC 202. The search screen may be displayed on a Web browser, or by installing a client application. A user uploads images used to create a photo book from the client PC 202 to the server 203, and the server 203 performs image analysis and a search process. To reduce a transmission load in image uploading, an alternative mode of performing image analysis on the client PC 202 is also conceivable.

Figure 3:
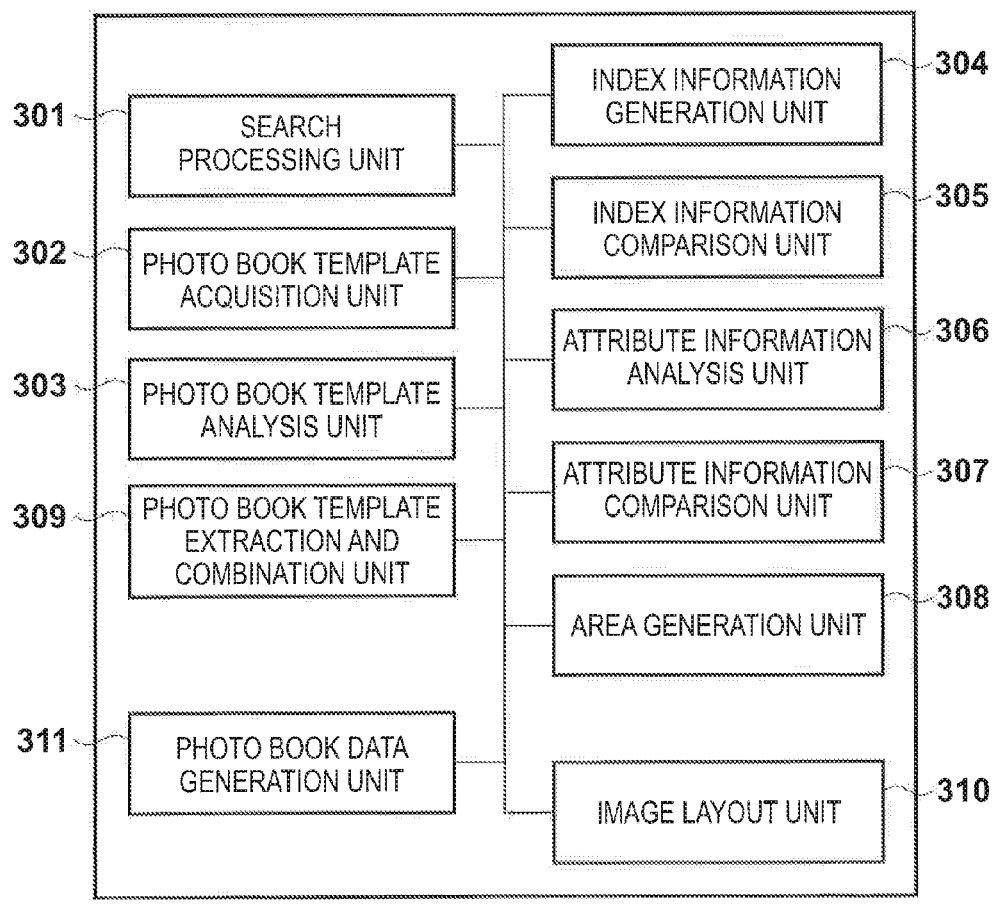
FIG. 3 is a functional block diagram showing an example of an application configuration.

FIG. 3 is a functional block diagram of the search application according to this embodiment. This embodiment provides an apparatus for searching, based on an image group used to create a photo book, for existing photo book templates that are close to the photo book to be created.

A search processing unit 301 controls the entire search process. For example, the search processing unit 301 receives instructions for the search process, invokes each process, and generates a search result, and so on. A photo book template acquisition unit 302 acquires photo book templates from a location such as a data server where photo book templates are stored. A photo book template analysis unit 303 refers to data on acquired photo book template and analyzes their contents. An index information generation unit 304 generates data (index information) used for speeding up the photo book template search process. An index information comparison unit 305 compares index information generated for each photo book template and performs a filtering process to determine whether or not each photo book template is a desired one. An attribute information analysis unit 306 acquires attribute information set to images and image frames in photo book templates. The attribute information acquired here may include position information such as the longitude and latitude. However, the attribute information may further include other information. An attribute information comparison unit 307 compares attribute information on an image and an image frame and specifically determines whether or not a photo book template is close to a desired one. An area generation unit 308 and a photo book template extraction and combination unit 309 divide a search region for an image group into small areas and search photo book templates in each of the thus divided small areas in order to acquire more appropriate photo book templates. The photo book template extraction and combination unit 309 has a feature of combining the thus acquired photo book templates. An image layout unit 310 and a photo book data generation unit 311 lay out images in the photo book template acquired through the search and generates photo book data.

[Photo Book Data Generation]

An example of generating photo book data using a photo book template and a captured image is described with reference to FIGS. 4 to 7. With this feature, the sharing and search of photo book templates can be used more efficiently.

Figure 4:
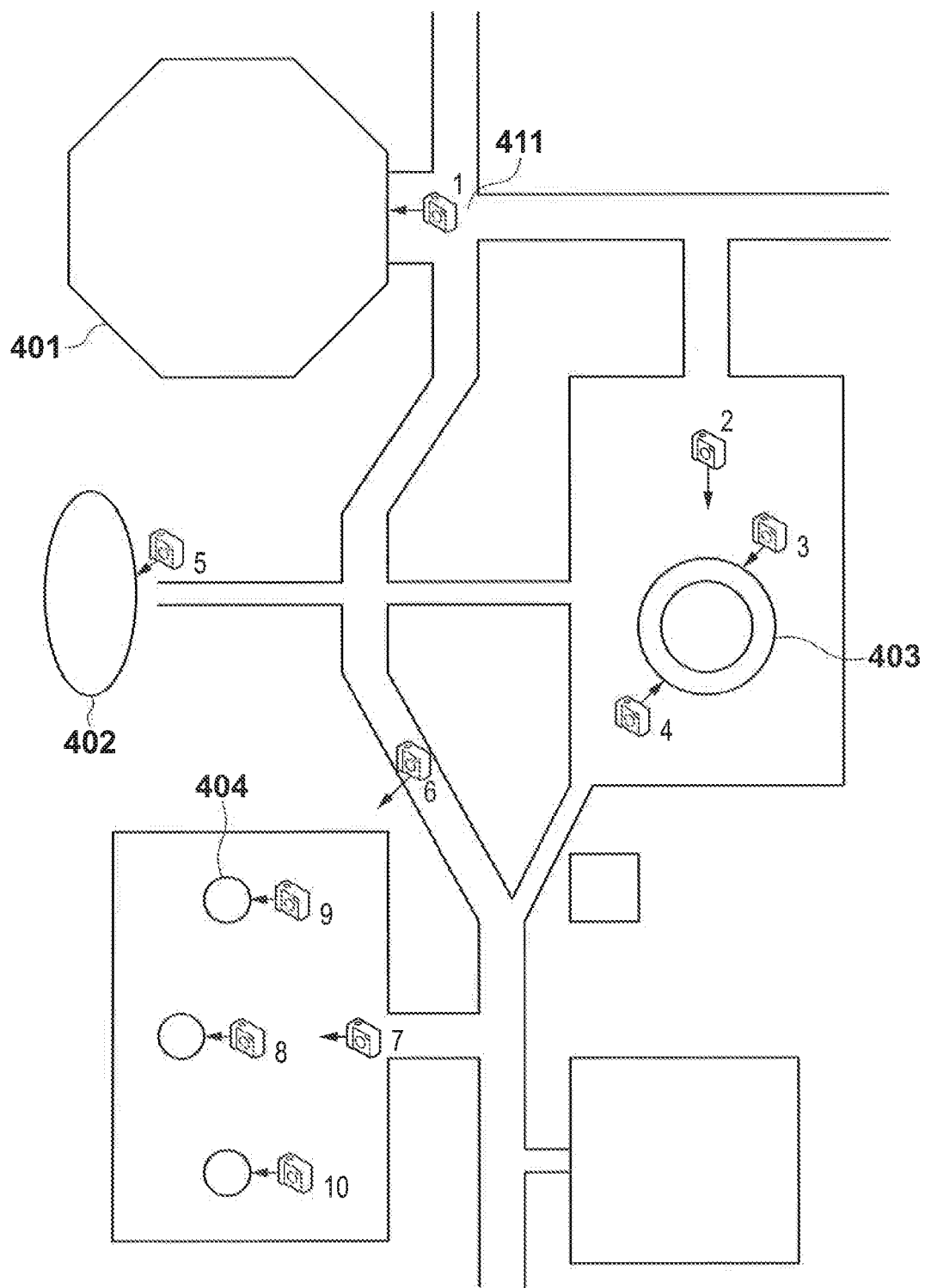
FIG. 4 is a diagram showing an image of a sightseeing place and shooting spots therein.

FIG. 4 shows an image of shooting spots in a sightseeing place. In FIG. 4, a sightseeing place such as a park is shown as an example, and objects 401, 402, 403, and 404 represent potential objects to be shot, such as a building, garden, fountain, and object. Camera icons shown with reference numerals 411 and so on represent shooting spots. Specifically, it is indicated that a photographer captures images from the positions of those icons. Arrows shown with the icons represent orientations in shootings, and the numbers shown with the icons corresponding to image numbers in FIG. 5.

There are shooting spots in a sightseeing place, and many visitors take images at those shooting spots. The images taken at the same shooting spot are often taken at the same position in a similar manner and therefore have similar contents (compositions and the like). Accordingly, the time and effort to create photo book data for the same sightseeing place can be reduced by storing, in the templates for the respective shooting spots, position information and editing information image layouts and trimming.

Figure 5:
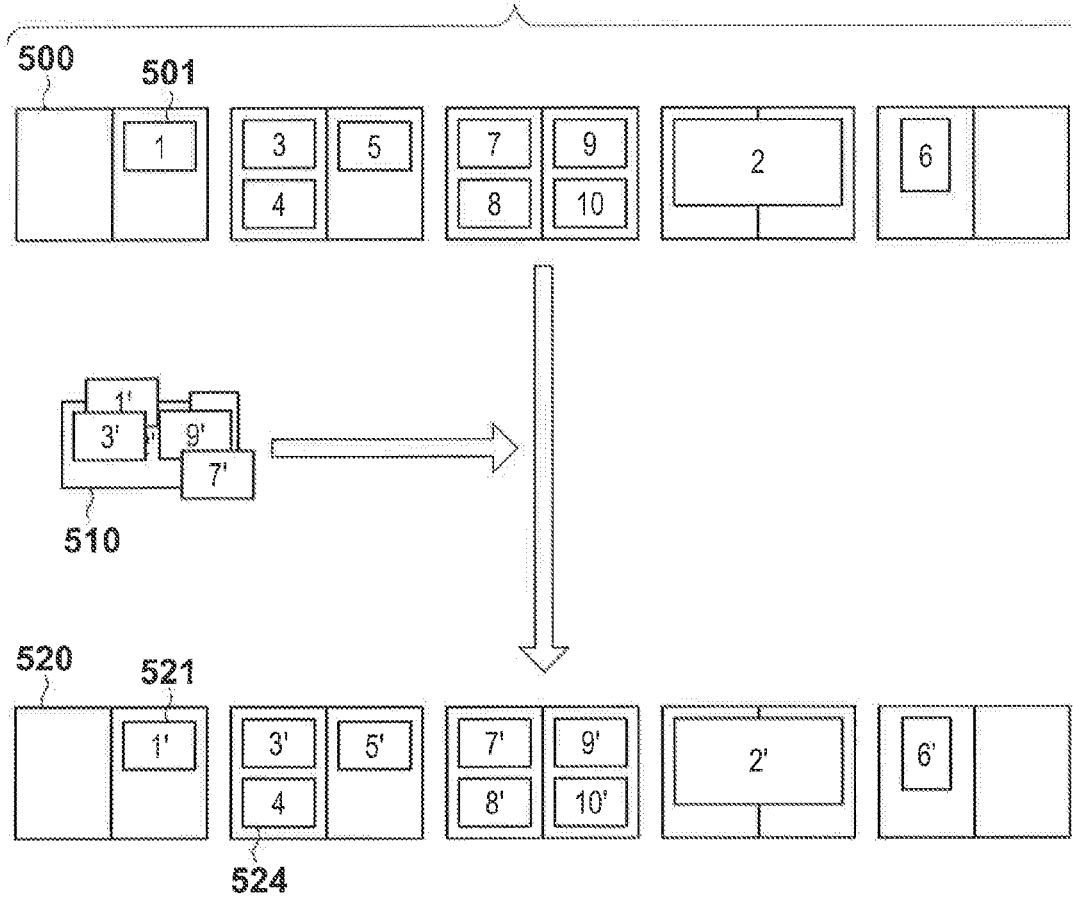
FIG. 5 is a diagram depicting automatic generation of photo book data.

FIG. 5 is a diagram depicting automatic creation of photo book data based on a photo book template. A photo book template 500 is an example of a photo book template, and images 510 represent a number of images taken by a user. Photo book data 520 is an example of photo book data created by automatically inserting the captured images 510 in the photo book template 500. Image frames 501 shown in the photo book template 500 are the image frames in which position information and editing information are held, and to which the respective images 510 are inserted. An image 521 represents the image inserted in the image frame 501. The number written on each image frame in the photo book template 500 corresponds to the shooting spot (icon) number in FIG. 4. The number written on each image in the photo book data 520 also corresponds to the shooting spot number in FIG. 4. Namely, the correspondence between the image frames 501 and the images 510 can be automatically checked by comparing their attribute information.

Figure 6:
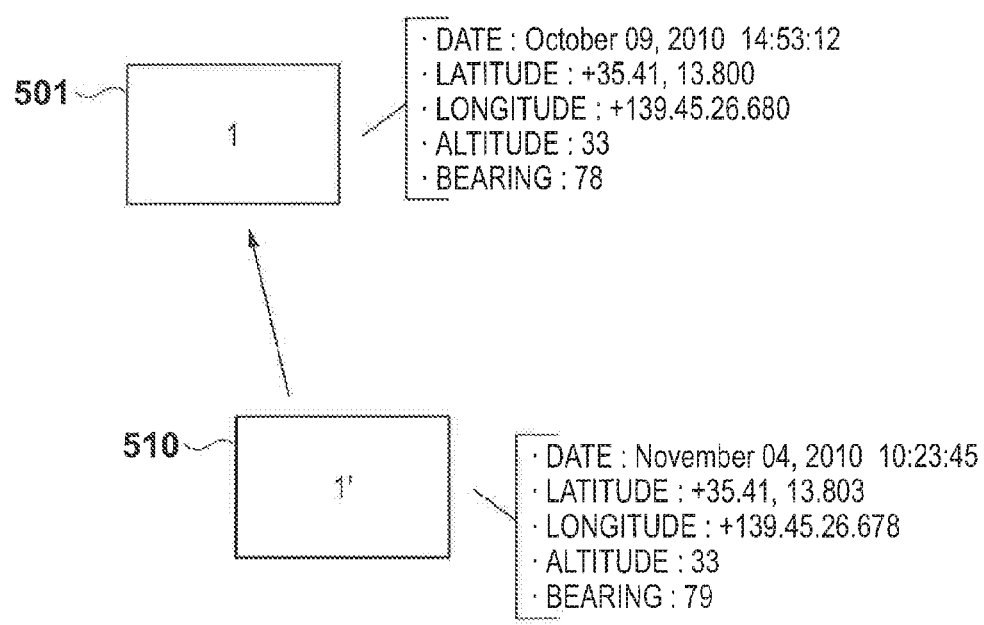
FIG. 6 is a diagram showing an example of correspondence between an image and an image frame based on position information.

FIG. 6 shows the correspondence between an image frame 501 and an image 510 based on their attribute information. The image frame 501 and the image 510 shown in FIG. 6 holds, as their attribute information, position information including the longitude, latitude, altitude, and bearing, and the like, and whether or not their shooting spots are the same is determined based on whether or not they have the same position information. At this time, a little difference in position information may occur even between the same shooting spots, so determination is performed in consideration of such difference. For example, between the image frame 501 and the image 510 in FIG. 6, there are differences of 0.003 seconds in the longitude, 0.002 seconds in the latitude, and 1 degree in the bearing, but those differences are considered to be within an acceptable range, and their shooting positions are determined to be the same. If the shooting positions are the same, it can be determined that the image can be laid out in this image frame.

In the above description, the correspondence is checked based on position information, but other modes of checking the correspondence using various attributes set for an image such as image orientation, scene information, and time information are also conceivable. Further, the above-described acceptable range of difference may be defined in consideration of characteristics of the respective shooting spots and objects.

An image frame 524 shown in FIG. 5 represents an image frame that has no corresponding image and accordingly has no image inserted. Because images may be not necessarily taken at all shooting spots in a photo book template, image frames with no images inserted may exist. In that case, such image frames may be deleted through the information processing apparatus or according to an instruction from a user after generating photo book data. Meanwhile, a photo book template may not always include all shooting spots. In this case, a user can adjust images or add images after generating photo book data.

In this embodiment, images are adjusted or added by using an editor for generating photo book data. Needless to say the editor can create photo book data without any photo book template, and photo book templates may be created from the photo book data generated by the editor.

Figure 7:
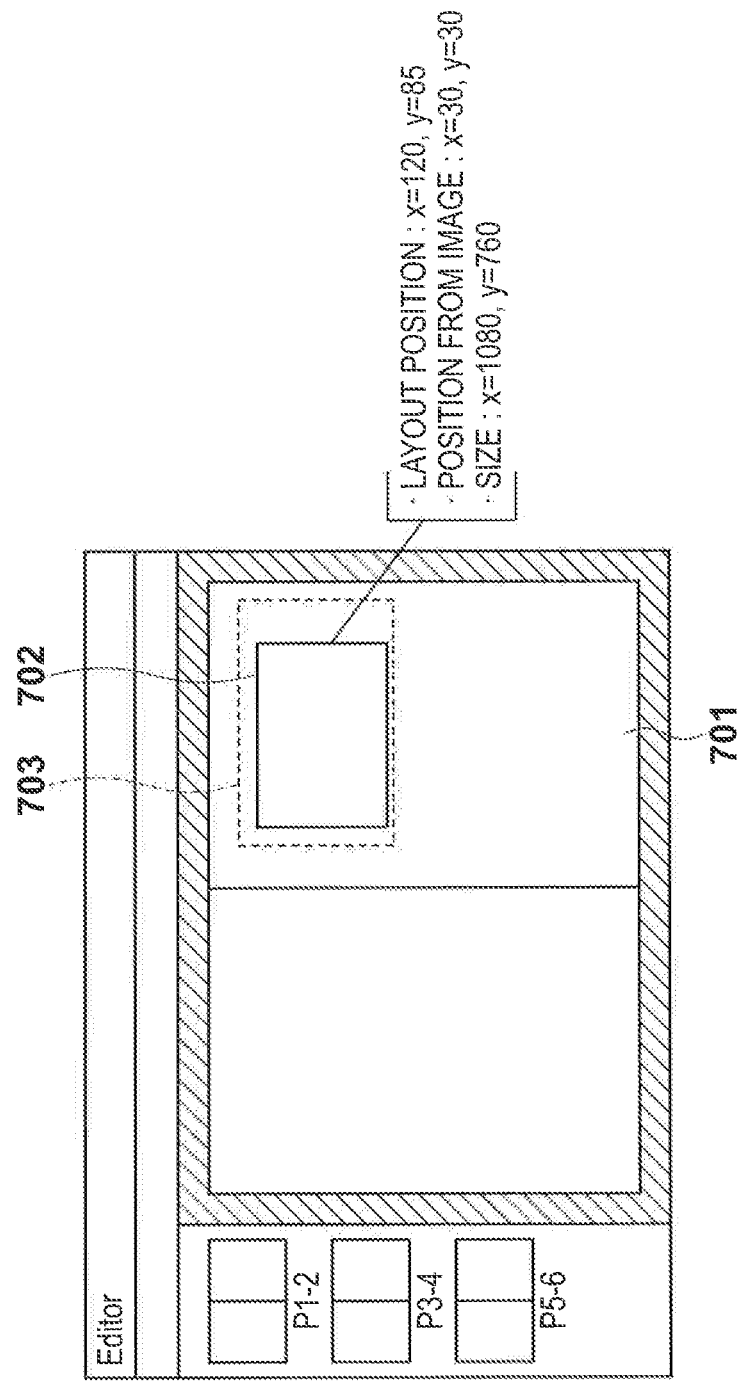
FIG. 7 is a diagram showing an example of an editor for setting image frames and images.

FIG. 7 shows an image of the editor for creating photo book data according to this embodiment, in which an image frame and an image are being set. The editor shown in FIG. 7 includes a page 701, an image frame 702, and an image 703 in the photo book data. The image frame 702 indicates the position and size of a corresponding image. The image frame 702 represents a displayed image sifter the inserted image 703 is trimmed, and the region within the image frame 702 is the image region that are actually displayed on the photo book. As described above, the image frame 702 holds attribute information including position information on shooting spots, as well as editing information. Examples of the editing information include a frame size, layout position on a page, and trimming position indicated on an image indicating a trimming position, as shown here. FIG. 7 shows an example where a layout position and a trimming position are shown by pixel numbers, but in consideration of difference in image resolution in image taking devices, those positions may alternatively be shown by ratios.

Generated photo book data can also be output as a photo book template. Specifically, to reuse the photo book data as a photo book template, trimmed images are not just laid out on a page, but the information on both the image 703 and the image frame 702 are held such that position readjustment or adjustment needed when other images are laid out can be performed. A trimming position on an image can be readjusted by moving the image frame 702 and the image 703 on the editor. The editor shown in FIG. 7 displays outlines of pages on the left side of the screen. The configuration of the editor is not limited to the one shown in FIG. 7, and the screen layout may be changed, or other setting information may also be displayed according to user settings.

A user can output a photo book template from the created photo book data and publish it on the Web. Further, a mode of adding shooting places to an existing photo book template is also conceivable. Thus, the number and types of published photo book templates are increased and the coverage of shooting scenes is also improved.

As described above, if the photo book templates contain more shooting spots where a user took images, the amount of works is further reduced. Accordingly, by allowing a user to more easily acquire a desired photo book template, the photo book data creation feature according to this embodiment effectively works, leading to a reduced burden on the entire user operation.

[Photo Book Template Search]

A search feature for acquiring a desired photo book template is hereinafter described with reference to FIGS. 8 to 16. For the convenience of description, drawings of a broad range map with dots are used, but the size of dots does not correspond to the size of shooting spots in the actual scale.

Figure 8:
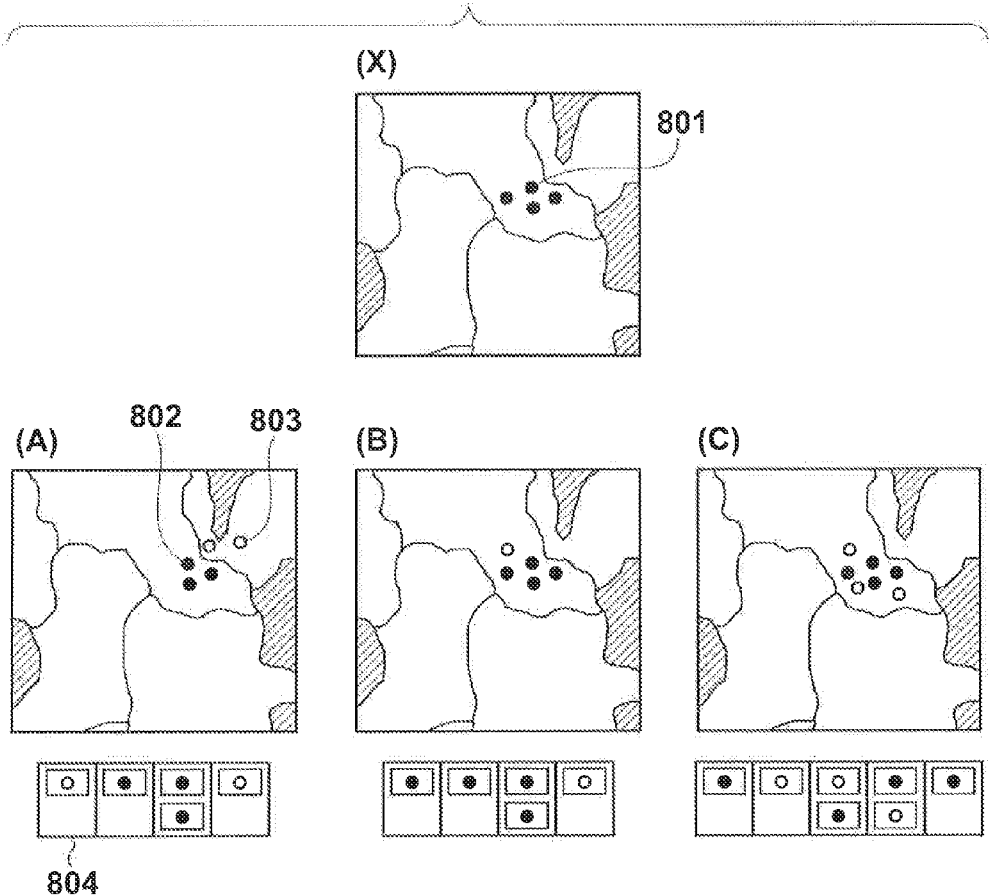
FIG. 8 is a diagram depicting photo book template search.

FIG. 8 is a diagram depicting an outline of the photo book template search operation. FIG. 8(X) is a map showing the locations of captured images used to create a photo book. Referring to FIG. 8 (X), dots 801 represent locations (shooting spots) where images were captured, and it is indicated that four images corresponding to four dots exist. FIGS. 8(A), 8(B), and 8(C) are maps indicating locations of shooting spots contained in photo book templates that are search subjects. It is assumed that those photo book templates corresponding to FIGS. 8(A), 8(B), and 8(C) are prepared in advance.

Referring to FIG. 8(A), black dots 802 represent shooting spots that exist at the same location as the dots 801 in FIG. 8 (X). White dots 803 in FIG. 8(A) represent shooting spots that do not exist at the location in FIG. 8(X). In other words, the photo book template of FIG. 8(A) includes three matched shooting spots (dots 802) and two unmatched shooting spots with respect to the four shooting locations in FIG. 8(X). A template 804 represents a simplified view of the photo book template and shows the layout of the image frames corresponding to the dots 802 and 803 that are the shooting spots in the template. Similarly, the photo book template shown in FIG. 8(B) includes four matched shooting spots and an unmatched shooting spot. The photo book template shown in FIG. 8(C) includes four matched shooting spots and three unmatched shooting spots.

In the photo book template search according to this embodiment, the degree of matching is regarded to be higher as the number of matched shooting spots is larger. Accordingly, in the example of FIG. 8, the degree of matching of FIGS. 8(B) and 8(C) is determined to be higher than that of FIG. 8(A). Further, a photo book template that needs less change when images are inserted is regarded to be more suitable. When photo book data is generated, not only one image but a number of images are laid out in consideration of relative positions with other images and the entire balance. Therefore, in the case where a photo book template includes image frames in which captured images are not inserted, the entire balance is less likely to disrupt if change in image positions or deletion of unnecessary pages are less necessary.

When FIGS. 8(B) and 8(C) each including four matched shooting spots are compared, in FIG. 8(B) only the last page is unnecessary, while in FIG. 8(C) the second page from the left is unnecessary and one of the two image frames in the third and fourth pages has to be deleted, respectively. Accordingly, even though the number of matched shooting spots in FIGS. 8(B) and 8(C) is the same, it is expected that change in layout is less necessary in FIG. 8(B), and so the degree of matching of FIG. 8(B) is determined to be higher in the search. Accordingly, in the example shown in FIG. 8, the degree of matching of FIG. 8(B) is higher than 8(C) and 8(A) in this order.

Figure 9:
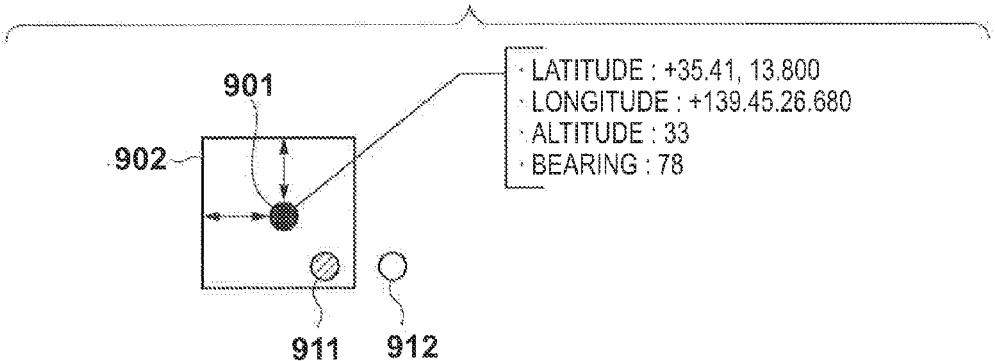
FIG. 9 is a diagram depicting matching determination of a shooting location.

FIG. 9 is a diagram depicting the matching determination of shooting locations. In FIG. 8, the location of the shooting spots indicated by the dots 801 in FIG. 8(X) is determined to be the same as the shooting spots indicated with the dot 802 in FIG. 8(A), but in practice, the values may not always completely coincide with each other even if those shooting spots are the same. Therefore, the matching of position needs to be determined in consideration of difference to some extent. A dot 901 represents a shooting spot, which contains its attribute information such as the latitude and longitude as shown in FIG. 9, as well as the altitude and bearing. A region 902 represents the range of difference within which the location of shooting spots is determined to be the same as the dot 901. For example, difference of 0.01 second in horizontal and vertical directions of the longitude and latitude is set as an acceptable range (the range indicated by the region 902). Dots 911 and 912 represent the shooting positions shown based on attribute information held by actual images. When those shooting spots of the images are compared for matching with the shooting spot indicated by the dot 901 defined in the photo book template, the dot 911 is included in the region 902 and so determined to be matched. Meanwhile, the dot 912 is out of the range of the region 902 and so determined to be not matched with the shooting spot indicated by the dot 901.

Here, in order to reduce a burden of computation processes for the program, the region 902 is shown as a square zone. However, the region 902 may alternatively be shown as a circle with the dot 901 as a center. Further, the shooting position of a captured image of which the degree of matching is calculated and the shooting spot in the photo book template may be used in an opposite manner. In other words, it may be determined whether or not the position of an image frame in the photo book template is included in the region around the captured image.

Furthermore, FIG. 9 depicts the determination of shooting position only using the longitude and latitude, but the determination may be performed also based on other attributes such as the attitudes and bearings. As for those other attributes too, it is conceivable that acceptable ranges of difference are set to take the difference into consideration for matching determination.

Figures 10, 11:
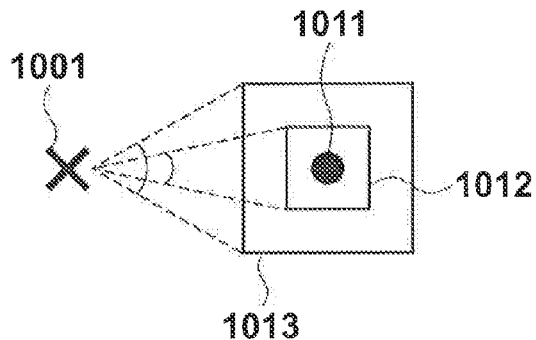
FIG. 10 is a diagram depicting acceptable difference in bearings.
FIG. 11 a diagram showing an example of a photo book template search screen.

FIG. 10 shows an example of an acceptable difference in bearings. FIG. 10 shows an object 1001 and a shooting position 1011. Acceptable ranges 1012 and 1013 both represent the acceptable ranges of difference in the longitude and latitude of the shooting position 1011. The acceptable range 1012 of difference in the longitude and latitude is wider than the acceptable range 1013. In this case, the angle of the object 1001 with respect to the shooting position is also wider in the acceptable range 1013. Accordingly, the bearing in the acceptable range 1013 is also considered to be wider than in the acceptable range 1012.

As described above, the acceptable ranges of attributes are related to each other, and the acceptable range of each attribute may be determined in conjunction with other attributes. For example, as shown in FIG. 10, the acceptable range of difference in the bearing may be determined depending on the acceptable ranges of difference in the longitude and latitude. More specific adjustment may be possible if the position information of an object is specified, and an angle of view of the lens in the image capturing device may also be utilized.

[Search Screen]

FIG. 11 shows an example of a photo book template search screen according to this embodiment. Referring to FIG. 11, a text box 1101 is used to designate a location of an image used to crease a photo book. Input methods for the text box 1101 include directly entering an image file name and selecting an image file. Upon pressing a reference button 1102, a screen for referring to files on a computer is displayed, and an image file can be selected from among those files. As a plurality of image files exit, a list of image files may be designated using the text box 1101. Alternatively, a folder storing image files may also be designated. When a folder is designated, a screen displayed by pressing the reference button 1102 is the one for selecting a folder.

A check box 1103 and a list box 1104 are designed to control selection of a photo book design. In many cases, photo book templates are categorized by designs such as natural design, pop design, and cute design, and a template design of user's choice is applied to the photo book. When the check box 1103 is checked, the search scope can be limited by the design designated at the list box 1104. A plurality of designs may be designated, and the designating method is not limited to the list box type.

A check box 1105 and a text box 1106 are designed for control to specify the acceptable range of difference in the longitude and latitude used in the comparison between shooting locations and shooting spots. When the check box 1105 is checked, a value specified at the text box 1106 is used as the acceptable range in difference. If not specified, a default value is used.

Check boxes 1107 to 1110 are designed for control to designate whether or not to compare attributes other than the longitude and latitude when comparing shooting positions and shooting spots. Any attributes other than the above-mentioned attributes set for images may also be used in search as matching criteria of shooting spots. A check box 1111 and text boxes 1112 and 1113 are used when specifying a search scope of creation dates of photo book templates. When the check box 1111 is checked, the search objects are narrowed by the range of dates entered in the text boxes 1112 and 1113. A start date of the range and end date of the range are entered in the text boxes 1112 and 1113, respectively. A button 1120 is a button for executing the search. Upon pressing the button 1120, the photo book template search is executed under the conditions specified on the screen shown in FIG. 11. The search screen is not limited to the one shown in FIG. 11 and may be configured to allow more specific settings or provided with a button to move to a screen for advanced settings.

[Index Information]

Figure 12:
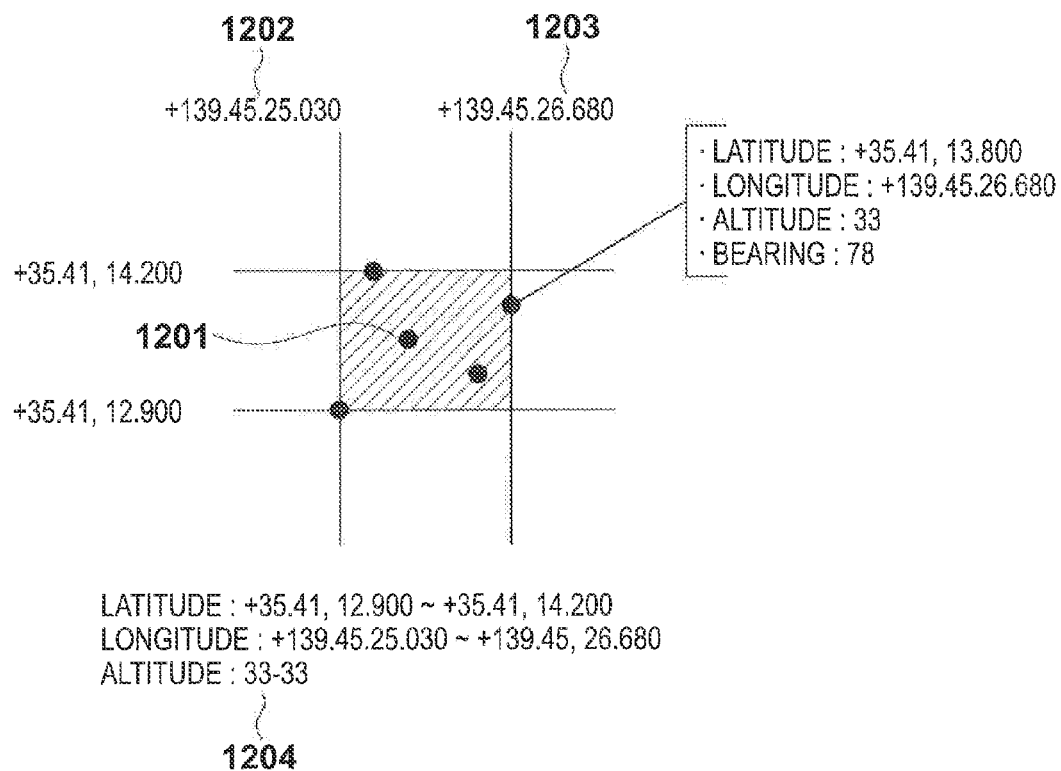
FIG. 12 is a diagram depicting index information in a photo book template.

FIG. 12 is a diagram depicting index information on a photo book template. In the photo book template search, a large number of search objects may possibly exist. If all shooting spots set in the photo book templates are used for comparison, the search takes a great amount of time. Therefore, a method of providing index information for roughly filtering the search objects is conceivable. An example related to filtering applied to this embodiment is shown in FIG. 12.

Referring to FIG. 12, a dot 1201 represents position information on a shooting spot placed on a photo book template, and FIG. 12 contains five shooting spots. A vertical axis 1202 indicates the minimum value of the longitude in the five shooting spots, and a vertical axis 1203 indicates the maximum value thereof. In other words, it is indicated that the longitudes of the five shooting spots are included in a region defined by the vertical axes 1202 and 1203. The minimum and maximum values of the latitude are also shown in a similar manner. Accordingly, comparison subjects are filtered based on the index information (region information) generated based on the values of the longitude and latitude in a certain range. Index information 1204 shows the index information on the range defined by the horizontal and vertical axes. The range of the longitude, latitude, and altitude and the like of shooting spots in the photo book template are held as the index information. In this embodiment, the bearings greatly vary depending on shooting spots and so are not included in the index information.

The index information on photo book templates used here is prepared in advance when creating the photo book templates. The index information on not only photo book templates but also images inserted to the photo book is generated. When the search is executed via the screen shown in FIG. 11, index information is formed based on the image group designated at the text box 1101 in a similar manner as shown in FIG. 12. In the search, templates can be filtered by comparing the index information between the image group and the photo book templates, without comparing with shooting spots. After the filtering, the image group is compared with each shooting spot in the photo book templates that are the subject for search.

FIG. 13 is an example of a photo book template search result screen displayed after the search is executed via the screen of FIG. 11. A guidance character string 1301 indicates the number of hit templates in the search. A list of the hit photo book templates is shown below the guidance character string 1301. Those templates are listed in the order of the degree of matching described in FIG. 3. A title 1311 is the title of the first hit photo book template, which best matches the search criteria. The title of each template is set when photo book data is generated or the photo book template is created. The number 1312 of hit images and a creation date 1313 are character strings indicating bibliographic information on the first photo book template. The number 1312 of hit images is the number of shooting spots in the photo book template that match the position information on an image used to create the photo book. In the example of the number 1312 of hit images, 17 matched shooting spots in 17 images exist in the photo book template. The creation date 1313 is the date when the photo book template was created. A photo book template details screen is displayed by pressing a button 1314. The details screen will be described later with reference to FIG. 14. Photo book data is generated using this photo book template by pressing a button 1315. The photo book creation is as already described with reference to FIGS. 4 to 7. A title 1321 is the title of the second photo book template. Other items are shown in a similar manner to the first photo book template.

The photo book templates hit in the search can also be filtered with the number of hit images. For example, by setting "the number of 12 or more hit images" as the display criteria, photo book templates with less than 12 hit images may be regarded as not being hit and not displayed on the list. Further, the order of hit templates can be changed using the template bibliographic information. For example, the templates can be reordered based on user settings in a reverse chronological order of creation date or in the order determined based on titles used as a reference.

FIG. 14 is an example of a photo book template search result details screen, which is displayed when a button 1314 shown in FIG. 13 is pressed. The screen shown in FIG. 14 is an image of the content displayed when a detail button corresponding to the fourth photo book template titled "Cherry blossom viewing 2011" in FIG. 13 is pressed. A title 1401 is the title of the photo book template. The title shown in FIG. 14 corresponds to the title shown in FIG. 13. The details screen shown in FIG. 14 shows as bibliographic information a photo book template creation date 1402, a creator 1403, the number 1404 of pages, and a design 1405. The design 1405 is set when photo book data is generated or a photo book template is created.

A hit image 1406 shows position information on images used to create a photo book and the number of matched shooting spots in the photo book template. Below the hit image 1406, thumbnails of the image group used to create the photo book are displayed. The thumbnails of images that match the shooting spots in the template are highlighted as shown with an image 1407, and those of unmatched images are not highlighted as shown with an image 1408. A user, after generating photo book data, can add unmatched images to the template if desired. The display form of hit images is not limited to the highlighting, and any forms with which hit images are clearly shown to a user is applicable.

Upon pressing a button 1409, photo book data is created using the photo book date. Pressing a button 1410 returns the screen to the search result screen shown in FIG. 13.

[Photo Book Template Search Process Flow]

Next, a flow of a photo book template search process is described with reference to FIGS. 15 and 16. This process is performed by the CPU 102 in the information processing apparatus shown in FIG. 1 executing programs read out from the memory 103 used as storage.

Figure 15:
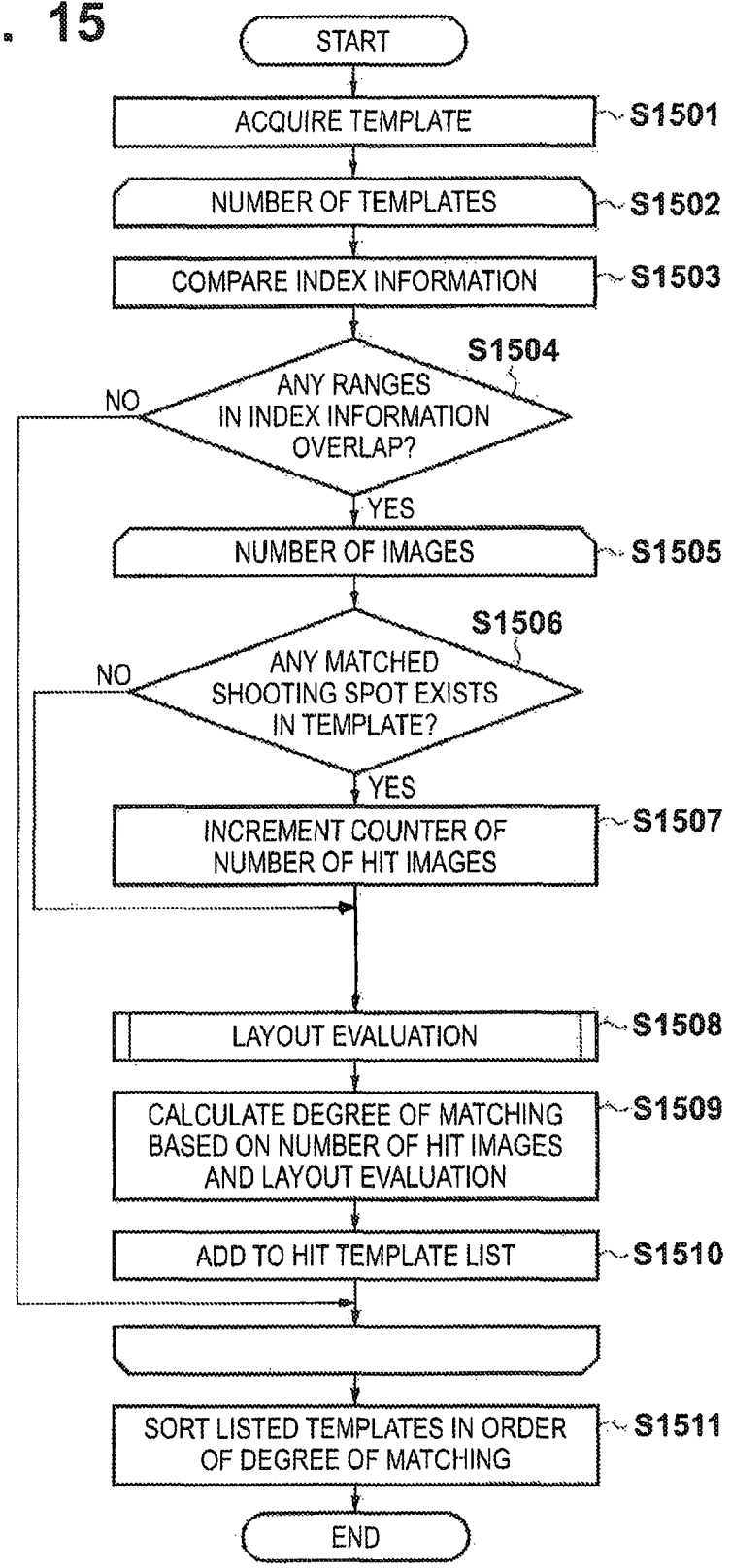
FIG. 15 is a flowchart of photo book template search.

FIG. 15 is a flowchart of photo book template search. The CPU 102, upon commencing the search process, first acquires photo book templates that are the search subjects (S1501). The photo book templates acquired here are those extracted as the search subjects based on the search criteria set in FIG. 11. The CPU 102 then performs a looping process of S1503 to S1510 as many times as the number of the photo book templates (S1502). In the looping process, the CPU 102 compares index information on a focused photo book template with that of an image (S1503). If there are no overlapping ranges in the index information, the processing proceeds to the comparison for a next template (NO at S1504), but if any ranges overlap, the processing proceeds to S1505 to check the details (YES at S1504). The CPU 102 then performs a looping process of S1506 to S1507 as many times as the number of images (S1505).

The CPU 102 determines in the looping process whether or not any shooting spot in the photo book template matches the focused image exists (S1506). If any shooting spot matches (YES in S1506), the CPU 102 increments a counter of the number of matched images (S1507). Then, the above comparison is performed for all images.

After finishing comparison between all images with the focused photo book template, the CPU 102 evaluates the layout of the photo book template (S1508). This process will be described later with reference to FIG. 16. After finishing the layout evaluation process, the CPU 102 calculates the degree of matching based on the number of hit images and the result of the layout evaluation (S1509). Then, the CPU 102 adds the focused photo book template to the list of hit photo book templates (S1510). All templates are subjected to the above-described check.

After checking all photo book templates, the CPU 102 sorts the listed photo book templates in the order of the degree of matching (S1511). After that, the sorted search result is displayed on the screen as shown in FIG. 13.

Figure 16:
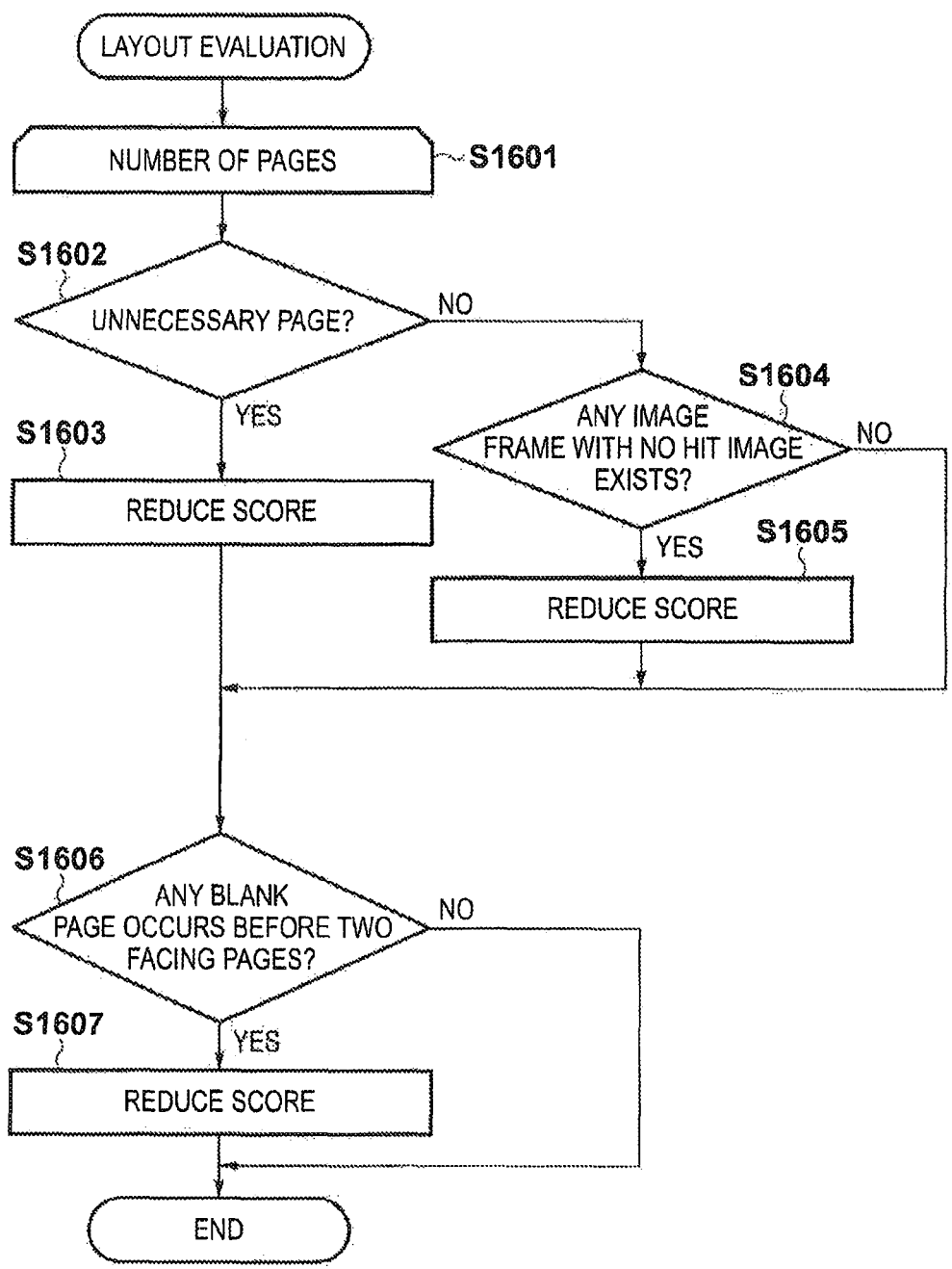
FIG. 16 is a flowchart related to raking in photo book template search.

FIG. 16 is a flowchart of the layout evaluation related to the ordering in the photo book template search, which corresponds to the process in S1508 in FIG. 15. This process is also performed by the CPU executing programs read out from the memory 103 used as storage. Various methods for the layout evaluation are conceivable, but one of the examples is described here. In this evaluation method, a score value indicating the degree of matching is provided to each photo book template. The degree of matching is reduced in accordance with the criteria.

The CPU 102 performs a looping process of S1602 to S1605 as many times as the pages contained in a focused photo book template (S1601). In the looping process, if there is no image frame with hit images in the focused page and therefore this page is unnecessary (YES at S1602), the CPU 102 reduces the score value of the focused photo book template (S1603). Even when there is no unnecessary page (NO at S1602), if the focused page has any image frame with no hit image (YES at S1604), the CPU 102 reduces the score value of the focused photo book template (S1605). After checking all pages contained in the focused photo book template, the CPU 102 entirely checks the focused photo book template. In the evaluation method here, if there are two facing pages and a blank Page occurs before those two facing pages when an unnecessary page is deleted (YES at S1606), the CPU 102 reduces the score value of the focused photo book template (S1607). As the score value of a photo book template becomes lower as a result of the process, the layout evaluation for that template also becomes lower. In the flowchart shown in FIG. 16, the score reduction is performed at S1603, S1605, and S1607, but the specific value to be reduced may be changed depending on the criteria.

With the above-described process, the photo book templates close to the photo book to be created can be obtained. The photo book data described in FIG. 5 is smoothly generated with the above-described process, and user's effort and time can be saved.

[Photo Book Template Acquisition for an Image Group Taken in a Broader Area]

Next, a photo book template acquisition process that is more suitable for the case where an image group included in a photo book is taken in a broader area is described with reference to FIGS. 17 to 20.

As an area including shooting locations contained in a photo book template is narrower, the template is more likely to have hit shooting locations, while as the area is broader, the template is less likely to have hit shooting locations. For example, in the case of the park shown in FIG. 4, the shooting location can be relatively easily identified, and it highly likely that hit shooting locations exist. However, for example, it is assumed that a user traveled around over several prefectures or regions and is creating a photo book using an image group captured over a certain region. In this case, there are various travel destinations and sightseeing places within that region, and it is less likely that the photo book template tor the same travel route exists. Accordingly, the possibility that the shooting locations of the images match the shooting spots defined in photo book templates is reduced too.

FIG. 17 is a diagram related to the photo book template search for a broader area. FIG. 17(X) is a map (area) showing locations where images used to create a photo book were captured. As in FIG. 8(X), black dots represent the shooting position of images. FIG. 17(A) is a map showing a photo book template hit in the search. As in FIG. 8(A), black dots represent the locations where the shooting spots in the photo book template match the shooting spots of the images, and white dots represent unmatched shooting spots. Because the images were taken in a broad area over an entire region as shown in FIG. 17(X), no photo book template corresponds to this broad area, and therefore only a small number of hit shooting locations exist. A template 1701 is a simplified photo book template, in which there are only a few insertable image frames, and so many of the images have to be manually inserted.

Figure 18:
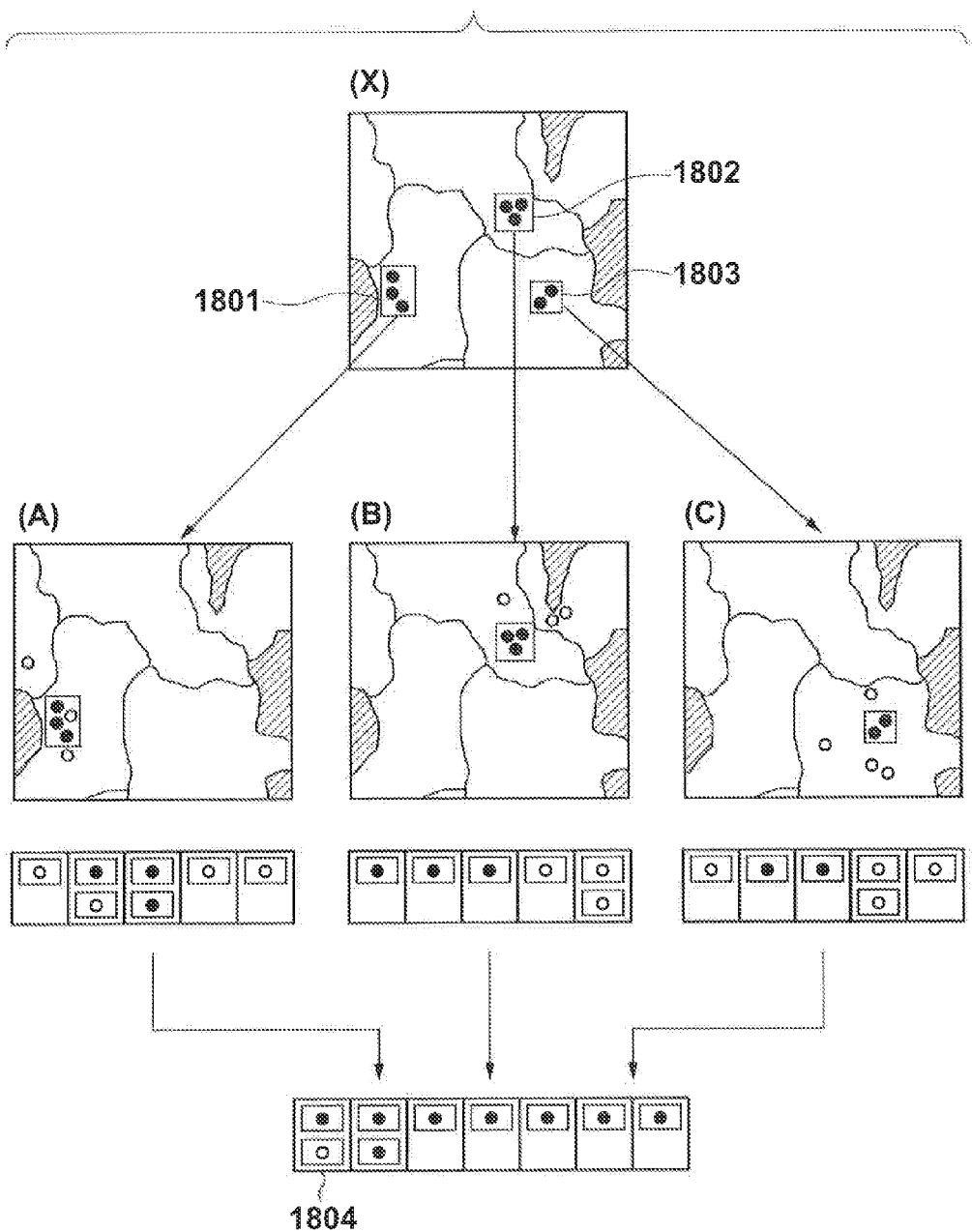
FIG. 18 is a diagram depicting optimum photo book template creation.

FIG. 18 is a diagram related to a process for creating a photo book template suitable for an image group captured in a broader area. FIG. 18(X) is the same as FIG. 17(X), which is a map showing the locations where the images used to create a photo book were captured, and the shooting area of the images spreads broadly. If all images included in this area are subjected to the search, suitable photo book templates cannot be found as described in FIG. 17.

[Area Generation]

To address the above-described problem, in this embodiment, images having approximate values of position information are grouped. Here, the thus grouped region is referred to as "area." In areas 1801, 1802, and 1803, images having approximate position information values are grouped, respectively. By setting areas, each area containing images becomes narrow, and so suitable photo book templates can be acquired in each area by searching by area.

The region of a photo book template acquired by searching the area 1801 is shown in FIG. 18(A). Here, the area 1801 is made for a specific sightseeing place, and photo book template including the corresponding shooting spots can be obtained. Similarly, the ranges of photo book templates obtained by searching the areas 1802 and 1803 are shown in FIGS. 18(B) and 18(C), respectively. Each photo book template includes the shooting spots in the corresponding area. In this example, the photo book templates shown in FIGS. 18(A), 18(B), and 18(C) are of the highest degree of matching among the templates detected in each area.

In this example, three divided areas are searched, and so three photo book templates are detected. Accordingly, to acquire a photo book template desired for the images in FIG.

18 (X), the thus detected three separate photo book templates have to be combined. Here, a simplified view of a combined photo book template made from the three photo book templates is shown as a template 1804. The photo book template shown as the template 1804 is made by extracting and merging pages containing image frames within the areas searched in FIG. 18. For example, in the case of FIG. 18(A), pages having image frames included in the range of the area 1801 are extracted. Each area contains image frames that do not correspond to the shooting positions of the images designated as the search criteria, but those image frames are also included in the merged photo book template so as not to disrupt the layout as much as possible. Naturally, the mode of extraction and merger by image frame or merging the detected photo book templates without extraction is also conceivable.

Figure 19:
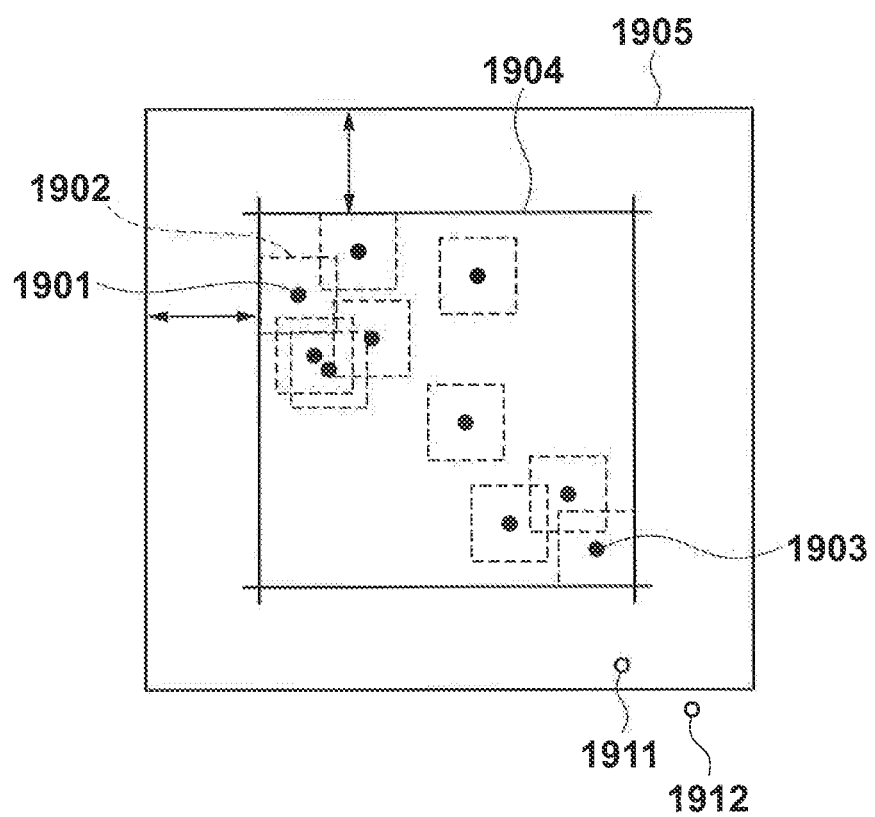
FIG. 19 is a diagram depicting area generation.

FIG. 19 is a diagram related to creation of the areas 1801, 1802, and 1803 in FIG. 18. A dot 1901 represents a shooting location of an image. A region 1902 represents a range of difference with the shooting spot shown as the region 902 in FIG. 9. The area creation in this embodiment is performed by grouping images of which the shooting locations are close to each other. Whether or not the shooting locations are close to each other is determined based on a predetermined threshold. For example, the threshold is set to a distance between shooting locations within 0.2 seconds in the longitude or latitude, and the shooting locations within that distance are grouped. At that time, if already grouped shooting locations exist within that distance from the shooting locations to be grouped from now, those already-grouped shooting locations acre also included in the new group. In other words, in FIG. 19, the shooting location represented by the dot 1901 is not within the distance of 0.2 seconds from the shooting location represented by a dot 1903, but those two locations are grouped through the shooting locations existing therebetween. Of course the threshold of distance between shooting locations is not limited to the above value, and the determination may also be performed based on the density or the number of shooting locations in a certain region.

After finishing the grouping of shooting locations, the northernmost, southernmost, westernmost, and easternmost positions (longitudes and latitudes) in the group are calculated. This calculation is performed over the range of the difference represented by the region 1902. For example, a line 1304 represents the northernmost line. After calculating the northernmost, southernmost, westernmost, and easternmost positions, positions outside of those positions (lines passing through the positions) at a predetermined distance are calculated, and an area 1905 is defined by framing the thus calculated outside positions. The value of this predetermined distance used in this calculation is also set in advance. For example, the distance is set to 0.2 seconds in the latitude from the northernmost and southernmost positions and 0.2 seconds in the longitude from the westernmost and easternmost positions, and a frame outside at a distance of 0.2 seconds from those positions is set as an area. In the example shown in FIG. 19, a dot 1911 on the photo book template is a shooting position within the area 1905, while a dot 1912 is not included in the area 1905. The above-described region is shown as a square but is not limited thereto, and for example, a circle with a predetermined radius from a central coordinate of a region including the image group may alternatively be defined as an area 1905.

Further, when creating an area, the index information described in FIG. 12 is also created for each area. The areas may also be created for the photo book templates. In that case, multiple sets of index information are generated and subjected to the index information comparison.

In the above description of FIGS. 18 and 19, the photo book templates of the highest degree of matching obtained in the search of each area are combined, and so the search result is a single photo book template. But alternatively, it is also conceivable to combine photo book templates in multiple manners for each area and obtain a plurality of search results.

[Process Flow]

Figure 20:
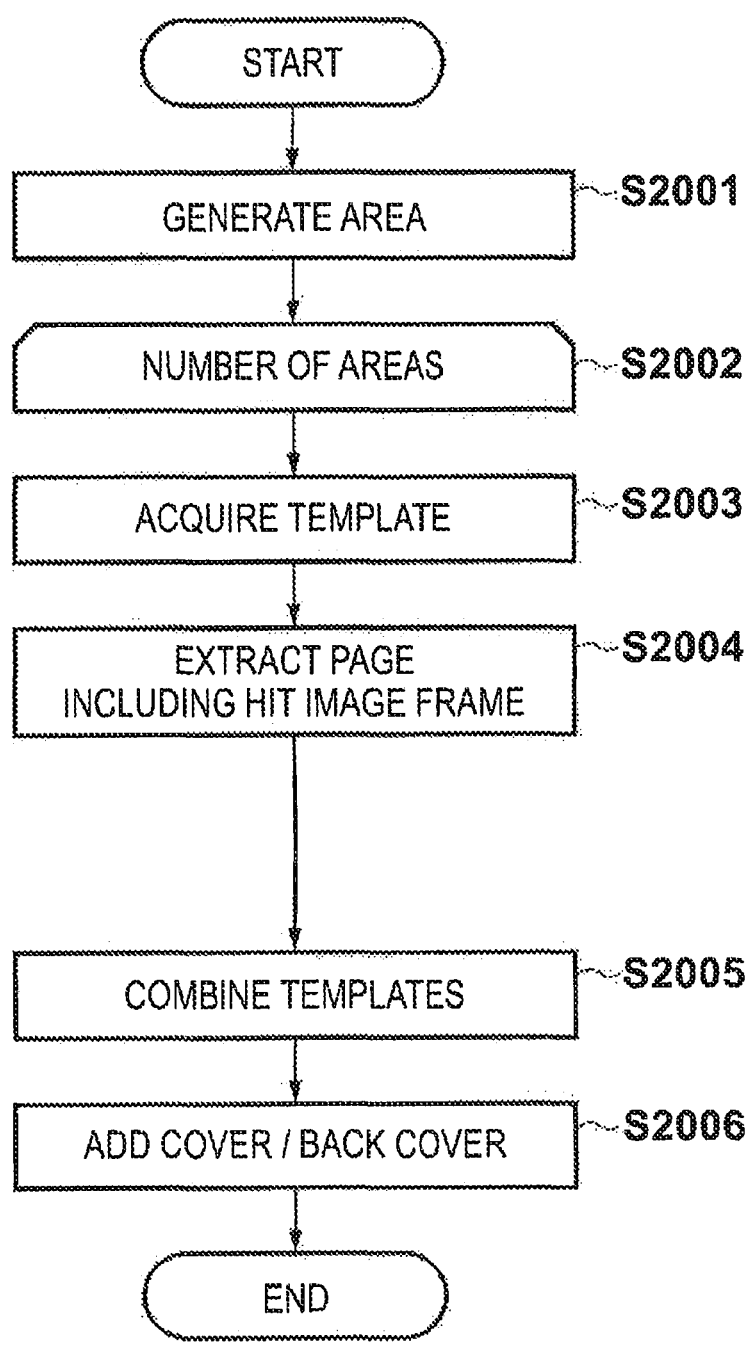
FIG. 20 is a flowchart related to photo book template creation.

FIG. 20 is a flowchart of the photo book template search and merger shown in FIG. 18. This process is performed by the CPU 102 executing programs read out from the memory 103 used as storage.

First, the CPU 102 sets an area for an image group used to create a photo book (S2001). Here, whether or not to set an area is determined based on the range of the longitude and latitude stored when generating the index information. A threshold as a criterion for creating an area is prepared in advance, and an area is set if the range of locations where the images used to create the photo book is a broad range exceeding the threshold. Next, the CPU 102 performs a looping process of S2003 to S2004 as many times as the number of generated areas (S2002). In the looping process, the CPU 102 acquires a photo book template (S2003). Then, the CPU 102 extracts pages including hit image frames from among pages contained in the acquired photo book template (S2004). In S2003 the search shown in FIG. 15 is performed, and the photo book template of the highest degree of matching is acquired. Although in this embodiment the photo book template of the highest degree of matching in each area is acquired, a plurality of acquired photo book templates may be shown to a user so that one of those templates can be selected.

After finishing the looping process as many times as the number of areas, the CPU 102 combines the pages in the photo book templates extracted in S2004 (S2005). After that, the CPU 102 adds a cover and back cover to the thus combined photo book template (S2006). The order of pages in the merged template may be determined by referring to the creation time contained in the attribute information of images. In S2006, the CPU 102 adds pages or information necessary for each page. If pages are not extracted in S2004 and photo book templates are directly combined, unnecessary covers and back covers in those photo book templates have to be removed.

Although details are not described here, if a user is allowed to select the order of combination or a design is not designated on the screen shown in FIG. 11, settings for selecting a design for the combined photo book template may also be available.

As described above, a user can obtain a desired template, and the efforts and time for creating photo book data is reduced. Furthermore, even if shooting locations of an image group spread over a broad region, an appropriate photo book template can be obtained.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-100135, filed Apr. 27, 2011, which is hereby incorporated by reference herein in its entirety.

What is claimed is:

1. An information processing apparatus for searching, from a plurality of photo book templates, for a photo book template to lay out a plurality of images therein, the information processing apparatus comprising a computer which functions as:
   a layout unit configured to compare position information of a shooting spot defined for each of a plurality of image frames included in the photo book templates with position information indicating a shooting position of each of the plurality of images, and to lay out, in an image frame among the plurality of image frames, an image among the plurality of images that matches the position information defined for the image frame; and
   a search unit configured to search for a photo book template to lay out the plurality of images therein based on the number of images laid out by the layout unit and a layout of the thus laid-out images,
   wherein the search unit calculates a degree of matching between each of the photo book templates and the plurality of images based on the number and a layout of the images laid out by the layout unit, and searches the photo book templates based on the thus calculated degree of matching.

2. The information processing apparatus according to claim 1, wherein the layout unit lays out, in an image frame, an image among the plurality of images that has the position information within a predetermined range from the position information defined to the image frame.

3. The information processing apparatus according to claim 1, wherein the computer further functions as an index information generation unit configured to generate, based on multiple sets of position information, region information on a region that contains the multiple sets of position information,
   wherein the index information generation unit generates the region information based on the position information on the plurality of images and the position information on the image frames in the photo book templates; and
   the layout unit, if the region indicated by the region information generated based on the position information on the plurality of images is included in the region information generated based on the position information on the image frames in one of the photo book templates, sets the photo book template as a subject for comparison with the plurality of images.

4. The information processing apparatus according to claim 1, wherein the computer further functions as a providing unit configured to rank, based on a result of the search by the search unit, the searched photo book templates for the plurality of images and to provide a result to a user.

5. The information processing apparatus according to claim 1, wherein the computer further functions as a classification unit configured to classify the plurality of images by a plurality of areas based on the position information on the images,
   wherein the layout unit compares the images classified by the plurality of areas by the classification unit with the photo book templates in each area.

6. The information processing apparatus according to claim 5, wherein the computer further functions as:
   an extraction unit configured to extract a page or pages each having an image frame to lay out the image therein from each of the photo book templates that match the images classified by the plurality of areas by the classification unit; and
   a combination unit for combining the pages extracted by the extraction unit.

7. The information processing apparatus according to claim 1, wherein the search unit calculates a higher degree of matching between a photo book template and the plurality of images as the number of images that can be laid out in the photo book templates is larger.

8. The information processing apparatus according to claim 1, wherein the search unit calculates such that if the photo book template includes a page where no image is placed or a page having an image frame in which no image is placed when the plurality of images are laid out in the photo book templates, the degree of matching between a photo book template and the plurality of images is reduced.

9. The information processing apparatus according to claim 1, wherein the search unit calculates such that if the photo book template includes two-facing pages after a page where no image is placed when the plurality of images are laid out in the photo book template, a degree of matching between a photo book template and the plurality of images is reduced.

10. A method for controlling an information processing apparatus that searches for a photo book template to lay out a plurality of images therein, the method comprising:
    a layout step of comparing position information of a shooting spot defined for each of a plurality of image frames included in the photo book templates with position information indicating a shooting position of each of the plurality of images, and laying out, in an image frame among the plurality of image frames, an image among the plurality of images that matches the position information defined for the image frame; and
    a calculation step of calculating a degree of matching between each of the photo book templates and the plurality of images based on the number and a layout of the images laid out in the layout step,
    wherein in the calculation step, a degree of matching between each of the photo book templates and the plurality of images is calculated based on the number and a layout of the images laid out in the layout step, and the photo book templates are searched based on the thus calculated degree of matching.

11. A non-transitory computer-readable medium storing a program for causing a computer to function as:
    a layout unit configured to compare position information of a shooting spot defined for each of a plurality of image frames included in photo book templates with position information indicating a shooting position of each of the plurality of images, and lay out, in an image frame among the plurality of image frames, an image among the plurality of images that matches the position information defined for the image frame, and
    a calculation unit configured to calculate a degree of matching between each of the photo book templates and the plurality of images based on the number and a layout of the images laid out by the layout unit,
    wherein the calculation unit calculates a degree of matching between each of the photo book templates and the plurality of images based on the number and a layout of the images laid out by the layout unit, and searches the photo book templates based on the thus calculated degree of matching.

* * * * *